UNITED STATES PATENT OFFICE.

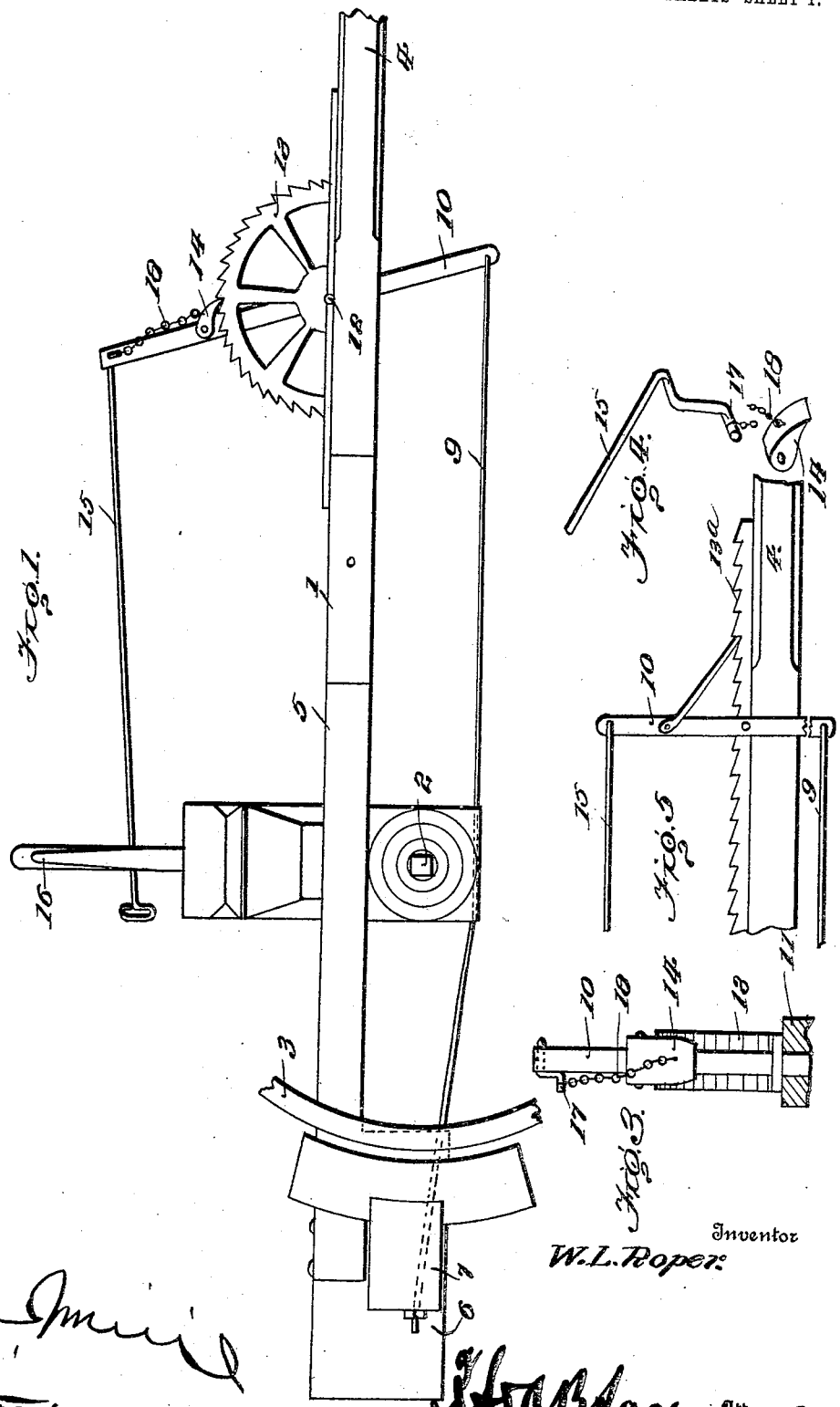

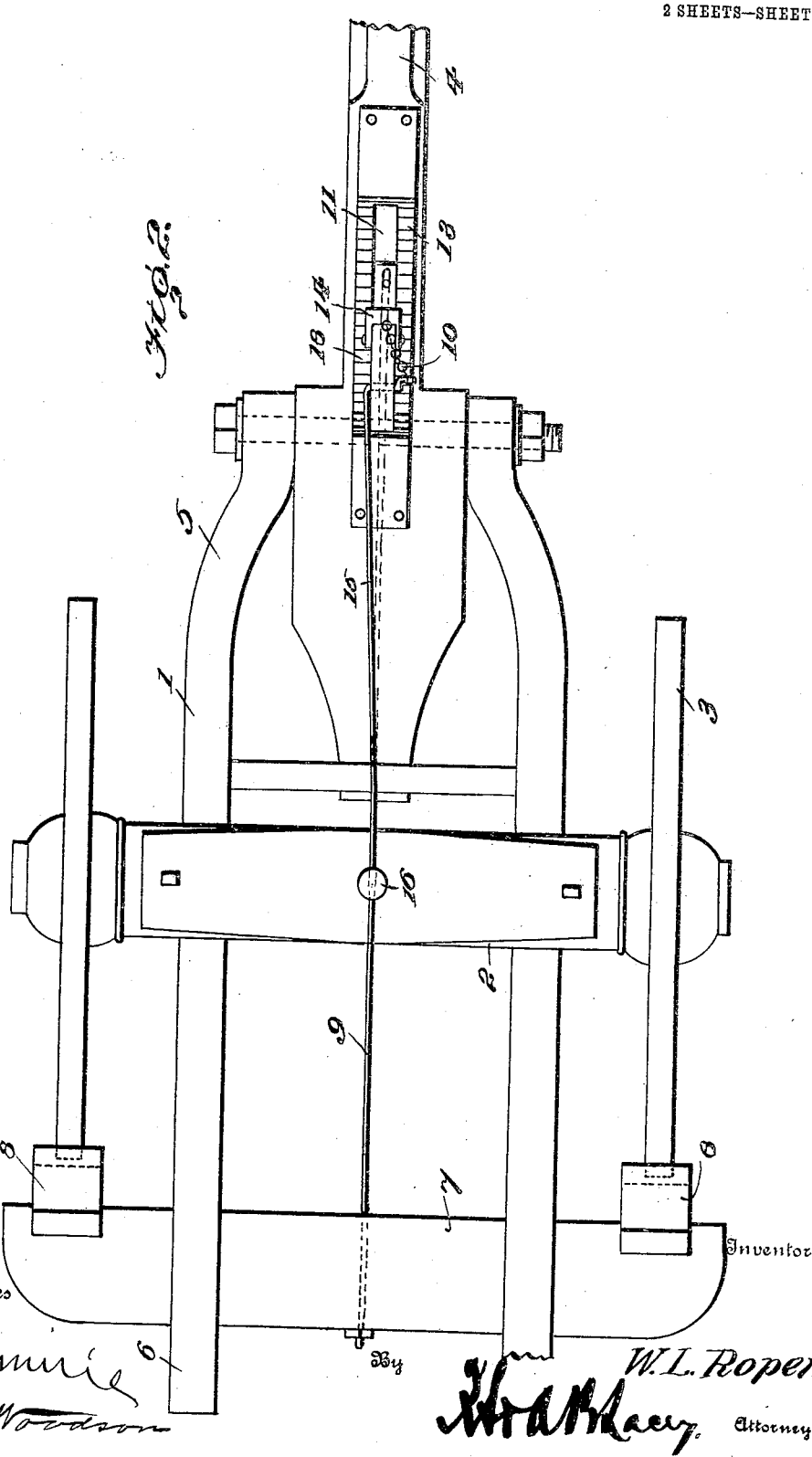

WALTER L. ROPER, OF MAPLESVILLE, ALABAMA, ASSIGNOR OF ONE-HALF TO N. J. ROGERS, OF TUSCALOOSA, ALABAMA.

WAGON-BRAKE.

No. 931,491.  Specification of Letters Patent.  Patented Aug. 17, 1909.

Application filed November 30, 1908. Serial No. 465,270.

*To all whom it may concern:*

Be it known that I, WALTER L. ROPER, citizen of the United States, residing at Maplesville, in the county of Chilton and State of Alabama, have invented certain new and useful Improvements in Wagon-Brakes, of which the following is a specification.

This invention comprehends certain new and useful improvements in brakes for use on wagons or other vehicles, and the invention has for its object an improved device of this character which is susceptible of being readily operated to be applied to or removed from the front wheels of the vehicle, which embodies to a marked degree the characteristics of simplicity, durability and efficiency in construction and operation, and which possesses certain other advantages that will become at once apparent as the invention is hereinafter disclosed, over the ordinary brakes in general use.

With this and other objects in view that will more fully appear as the description proceeds, the invention consists in certain constructions and arrangements of the parts that I shall hereinafter fully describe, and then point out the novel features thereof in the appended claims.

For a full understanding of the invention and the merits thereof, and to acquire a knowledge of the details of construction, reference is to be had to the following description and accompanying drawings, in which:

Figure 1 is a side elevation illustrating the application of my improved mechanism; Fig. 2 is a top plan view thereof; Fig. 3 is a detail view illustrating the connection between the handle and the pawl; Fig. 4 is a perspective view of the handle and its connection with the pawl; and, Fig. 5 is a detail view illustrating another embodiment of the invention hereinafter specifically described.

Corresponding and like parts are referred to in the following description and indicated in all the views of the drawings by the same reference characters.

My improved wagon brake is designed to be applied to a vehicle 1 which may be of any desired or approved construction or design, except that it is supported at its forward end by the usual axle 2 and front traveling wheels 3 carried thereby, a pole 4 being preferably provided in front of the axle 2 and being connected thereto through the instrumentality of suitable hounds 5. In the present instance, these hounds are extended rearwardly beyond the axle 2, and are provided at their extremities with guide-loops 6 in which a transversely disposed brake beam 7 is mounted for a longitudinally slidable movement, the opposite ends of the brake beam projecting laterally beyond the extended portions of the hounds, and carrying suitable shoes 8 that are adapted to be moved forwardly into contact with the respective wheels 3, as illustrated in Fig. 1. In order to shift the brake shoes longitudinally to effect an engagement with or disengagement from the wheels, I provide a brake-operating mechanism which embodies a connecting rod 9 that is secured at one end to an intermediate portion of the brake beam 7 and which has its other or forward end pivotally connected to the lower end of an operating lever 10. This lever passes through a longitudinal slot 11 formed in the pole 4, and is fulcrumed at an intermediate point upon the latter, as indicated at 12, the lever extending upwardly above the fulcrum point 12 and working between two transversely spaced toothed segments 13. These segments are designed to be engaged by a pawl 14 that is pivoted upon the upper arm of the lever beyond the line of the teeth of the segments and that is arranged to drop into engagement with such teeth to hold the lever effectually in position when the upper end thereof has been drawn rearwardly to effect the application of the brakes in a manner to be presently disclosed. Inasmuch as the operating lever 10 is located upon the pole 4, it is manifestly desirable that some means be provided whereby this lever may be conveniently manipulated from the forward portion of the wagon, such as the driver's seat, and for this purpose I preferably provide a longitudinally disposed handle 15 which is pivotally connected at its forward end to the upper extremity of the lever 10 and which extends rearwardly therefrom for a suitable distance and has its rear end adapted to be engaged with and supported by a standard 16, the latter being preferably provided in proximity to the driver's seat, so as to maintain the rear end of the handle in convenient reach of the driver. The forward extremity of the handle 15 is angularly disposed and forms a pintle that is journaled in the lever 10 to pivotally connect the handle thereto. The extremity of the pintle is offset, as best seen in Fig. 4, so as to constitute a crank arm 11 which is operatively connected to the pawl 14 by means of a chain 18 or other suitable flexible connecting member, the crank arm being disposed toward the pawl, in the normal position of the parts, that is, when the pawl is in engagement with the segments 13, so that the chain will be loose.

In the practical use of a brake constructed in accordance with my invention, when it is desired to apply the brake shoes 8 to the front wheels 4 to retard the progress of the vehicle, the operator grasps the rear end of the handle 15 and draws the same rearwardly so as to rock the operating lever 10 about its fulcrum point 12, the pawl 14 riding over the teeth so as not to interfere with the movement of the lever in this direction. This rocking movement of the lever obviously moves the lower end thereof forwardly so as to exert a forward tension upon the brake beam 7 through the instrumentality of the connecting rod 9, the brake beam being thereby shifted longitudinally and the respective shoes 8 being held forcibly in engagement with the wheels 3. When occasion demands that the brakes be removed, the handle 15 is disengaged from the standard 16 and is swung upwardly about its pivot point so as to move the crank arm 17 away from the pawl 14 to draw the chain 18 taut and thus lift the pawl out of engagement with the toothed segments. This manifestly releases the operating lever 10 which is then rocked in the reverse direction, to cause the brake beam 7 and the shoes 8 carried thereby to assume an inoperative position.

From the foregoing description, in connection with the accompanying drawings, it will be apparent that I have provided an improved brake which may be advantageously employed upon wagons and various other types of vehicles; which may be readily applied to the front wheels of a vehicle and held in such engagement as long as desired, and then conveniently removed from the wheels; which is simple and durable in construction and consists of comparatively few parts that are not likely to get out of order, even though subjected to hard usage, and which is capable of being comparatively easily and cheaply manufactured so as to be placed upon the market at a reasonable price.

In another embodiment of the invention, as illustrated in Fig. 5, the pawl 14 is arranged to engage substantially flat rack bars 13ª instead of the toothed segments 13.

Having thus described the invention, what I claim is:

1. The combination with a brake member, of an operating lever fulcrumed at an intermediate point upon the vehicle pole with one arm connected to the brake member, a rod pivotally connected at one end to the opposite arm of the lever and extending therefrom in proximity to the driver's seat to constitute a handle, a gravity-actuated pawl mounted on the lever, and an operative connection between the pawl and the handle, whereby to release the former by and upon the turning of the latter about its pivot.

2. In a brake mechanism, the combination with a brake member, of an operating lever connected to the brake member, a pawl carried by the lever, a bar constituting a handle and formed at one end with an angularly disposed portion journaled in the lever and pivotally connecting the handle thereto, the extremity of such angular portion being offset to constitute a crank, and an operative connection between the crank and the pawl whereby to release the latter by and upon the turning of the handle about its pivot.

In testimony whereof I affix my signature in presence of two witnesses.

WALTER L. ROPER. [L. S.]

Witnesses:
H. L. RUTLIFF,
W. H. SMITH.